United States Patent
Minami

(10) Patent No.: US 9,656,249 B2
(45) Date of Patent: May 23, 2017

(54) EXHAUST GAS PURIFICATION CATALYST

(71) Applicant: TOYOTA JIDOSHA KABUSHIKI KAISHA, Toyota-shi, Aichi-ken (JP)

(72) Inventor: Keiichi Minami, Suntou-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 14/789,068

(22) Filed: Jul. 1, 2015

(65) Prior Publication Data
US 2016/0023192 A1  Jan. 28, 2016

(30) Foreign Application Priority Data

Jul. 22, 2014  (JP) ................................. 2014-149211

(51) Int. Cl.
| | | |
|---|---|---|
| *B01J 23/889* | (2006.01) | |
| *B01J 23/00* | (2006.01) | |
| *B01D 53/94* | (2006.01) | |
| B01D 53/86 | (2006.01) | |

(52) U.S. Cl.
CPC ...... *B01J 23/8892* (2013.01); *B01D 53/9418* (2013.01); *B01J 23/002* (2013.01); *B01D 53/8628* (2013.01); *B01D 2255/2073* (2013.01); *B01D 2255/20707* (2013.01); *B01D 2255/20746* (2013.01); *B01D 2257/404* (2013.01); *B01D 2258/012* (2013.01); *B01J 2523/00* (2013.01); *Y02C 20/10* (2013.01)

(58) Field of Classification Search
CPC .. B01J 23/8892; B01J 23/002; B01J 2523/00; B01D 53/8628; B01D 2255/20746; B01D 2255/2073

See application file for complete search history.

(56) References Cited

U.S. PATENT DOCUMENTS 3,892,897 A * 7/1975 Rittler ................. B01D 53/944
423/247
4,814,153 A  3/1989 Kobayashi et al.

FOREIGN PATENT DOCUMENTS

| | | |
|---|---|---|
| JP | S62-282623 A | 12/1987 |
| JP | 2015-147166 A | 8/2015 |

OTHER PUBLICATIONS

Kurihara et. al., Magnetic Properties and Phase Diagram of CoxMn1—xTiO3 with Exchange Frustration, Jun. 1991, The Physical Society of Japan, Vo. 60, No. 6, 2057-2066.*

* cited by examiner

*Primary Examiner* — Matthew E Hoban
*Assistant Examiner* — James Fiorito
(74) *Attorney, Agent, or Firm* — Oliff PLC

(57) ABSTRACT

[Summary]
[Purpose]
To provide an excellent exhaust gas purification catalyst with satisfactory $NO_x$ selective reductive purification performance at lower temperature, and having a satisfactory $N_2O$ formation rate.
[Solution Means]
A selective reduction catalyst for exhaust gas purification, represented by the formula: $Co_xMn_{(1-x)}TiO_3$ (where x in the molar ratio is a value greater than 0 and 0.2 or less).

2 Claims, 1 Drawing Sheet

EXHAUST GAS PURIFICATION CATALYST

TECHNICAL FIELD

The present invention relates to an exhaust gas purification catalyst, and particularly to a $NO_x$-selective reduction catalyst.

BACKGROUND ART

In recent years, worldwide restrictions on exhaust gas are becoming tighter from the viewpoint of environmental protection. As one measure, exhaust gas purification catalysts are being employed in internal combustion engines. In order to efficiently remove the hydrocarbons (hereunder abbreviated as "HC"), CO and nitrogen oxides (hereunder abbreviated as "NOx") in exhaust gas, exhaust gas purification catalysts employ precious metals such as Pt, Pd and Rh as catalyst components.

Vehicles using such exhaust gas purification catalysts, such as gasoline engine vehicles and diesel engine vehicles, employ various types of systems designed to increase both catalytic activity and fuel efficiency. For example, in order to increase fuel efficiency, combustion is carried out under lean air/fuel ratio (A/F) conditions (oxygen excess) during steady operation, and in order to increase catalytic activity, combustion is temporarily conducted under stoichiometric (theoretical air/fuel ratio, A/F=14.7) to rich (fuel excess) conditions.

This is because conventionally known catalysts including precious metals such as Pt, Pd and Rh have low NOx purification performance under oxidizing conditions, and require a reducing atmosphere by addition of HC or CO to increase purification performance. There is consequently a limit to the increased fuel efficiency that can be achieved with catalysts of precious metals and the like.

With conventionally known catalysts of precious metals and the like, it has been necessary to use fuels that temporarily bring the purification catalyst into a reducing atmosphere. Also, in order to increase the fuel efficiency of internal combustion engines such as automobile engines, it has been a goal to obtain novel purification catalysts that can exhibit $NO_x$ purification performance under lean atmosphere conditions, for example.

There have also been attempts at modifications to increase the performance of NOx purification catalysts.

PTL 1 (Reference 1, claim 1 and elsewhere) describes an exhaust gas purification method wherein nitrogen oxide-containing exhaust gas, together with ammonia, is passed over a catalyst comprising 60 to 99.9 wt % of titanium-containing oxides, 0.1 to 20 wt % of at least one element from among copper, manganese and chromium and 0 to 20 wt % of at least one element from among vanadium, tungsten, molybdenum and tin, at a temperature of 200° C. to 500° C.

CITATION LIST

Patent Literature

[PTL 1] Japanese Unexamined Patent Publication SHO No. 62-282623

DISCLOSURE OF THE INVENTION

Problems to be Solved by the Invention

According to the invention of PTL 1, however, the $NO_x$ purification performance has been inadequate when ammonia is used as the reducing agent. In addition, while $MnTiO_3$ exhibits high SCR activity at a low temperature of 150° C., formation of nitrogen oxides such as $N_2O$, due to oxidation of $NH_3$, has been a problem at higher temperature ranges of 300° C. and above.

This has led to demand for catalysts with superior selective $NO_x$ reducing power and higher $NO_x$ purification rates. There is also a demand for lower NOx reduction temperatures.

Means for Solving the Problems

As a result of diligent efforts, the present inventors have found that an exhaust gas purification catalyst which is an oxide of Mn and Ti, wherein a prescribed amount x of Mn has been replaced by Co, has excellent properties in terms of selective $NO_x$ reducing power, and the invention has thus been completed.

The modes of the present invention are as follows.

(1) A selective reduction catalyst for exhaust gas purification, represented by the formula: $Co_xMn_{(1-x)}TiO_3$ (where x in the molar ratio is a value greater than 0 and 0.2 or less).

(2) The selective reduction catalyst for exhaust gas purification according to (1), wherein x is 0.1 or more and 0.2 or less.

(3) An exhaust gas purification method, employing the selective reduction catalyst for exhaust gas purification according to (1) or (2).

Effect of the Invention

According to an aspect of the invention it is possible to provide an exhaust gas purification catalyst with a more excellent $NO_x$ purification rate in the low-temperature range, and with minimized oxidation of $NH_3$ and improved high-temperature activity.

BEST MODE FOR CARRYING OUT THE INVENTION

Figure 1:
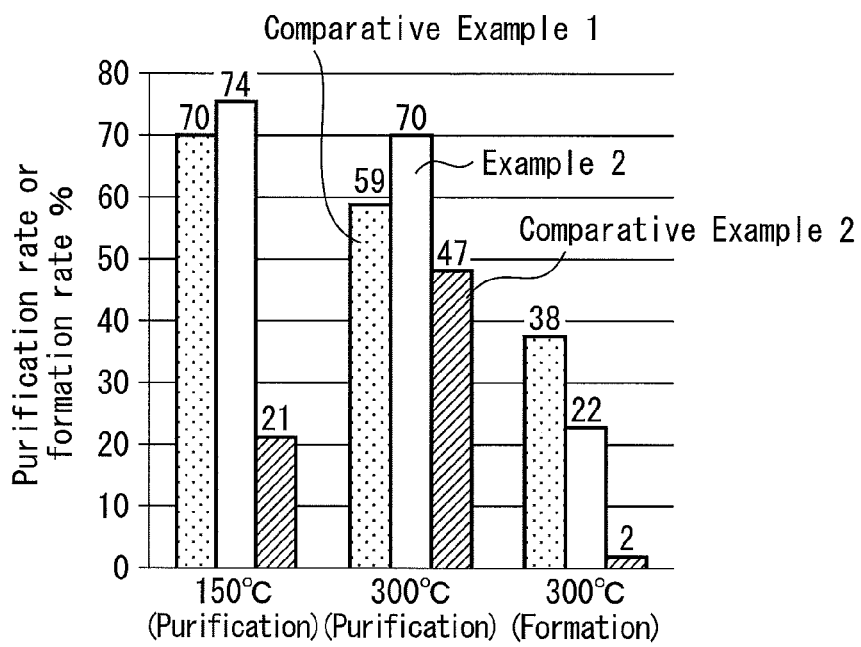
FIG. 1 is a graph plotting NOx purification rates at 150° C. and 300° C. and $N_2O$ formation rates at 300° C., for different samples with molar ratios x of 0.2 (Example 2), 0 (Comparative Example 1) and 1.0 (Comparative Example 2) in $Co_xMn_{(1-x)}TiO_3$.

The catalyst of the invention is an ilmenite-type selective reduction catalyst represented by the formula: $CO_xMn_{(1-x)}TiO_3$.

Conventional $MnTiO_3$, for example, is known to have $NH_3$ selective catalytic reduction (SCR) activity. With $MnTiO_3$, however, reaction between $NH_3$ and $O_2$, i.e. $NH_3+O_2 \rightarrow NO_x+nH_2O$, has taken place selectively over the reaction between $NH_3$ and NOx in the high-temperature range, producing large amounts of NOx. In addition, due to oxidation and consumption of $NH_3$, the $NH_3$ reducing agent has become deficient, resulting in a reduced NOx purification rate.

On the other hand, Co-based oxides are also known as $N_2O$ decomposition catalysts. In replacing a portion of Mn with Co, as explained below, it was found surprisingly, that the compound $Co_xMn_{(1-x)}TiO_3$, wherein Mn has been replaced by Co at a molar ratio of x<0.3, makes it possible to minimize formation of $N_2O$ by oxidation of $NH_3$, as well as formation of NOx produced by it, even in high-temperature ranges of 300° C. and the like, and to thus increase the NOx purification rate. Furthermore, it was possible to successfully increase the NOx purification rate at a low temperature of 150° C., for example, and to maintain high activity in the low temperature to high-temperature range, compared to conventional $MnTiO_3$.

While it is not our intention to be constrained by any particular theory, it is believed that the increased NOx purification rate at low temperature by the catalyst of the invention was achieved due to the oxidation-reduction effects of $Co^{2+}$ and $Mn^{2+}$.

With the catalyst of the invention, the Co content x may be, in terms of molar ratio, greater than 0, about 0.01 or more, about 0.02 or more, about 0.03 or more, about 0.04 or more, about 0.05 or more, about 0.06 or more, about 0.07 or more, about 0.08 or more, about 0.09 or more or about 0.10 or more, and about 0.30 or less, about 0.25 or less, about 0.22 or less, about 0.20 or less, about 0.19 or less, about 0.18 or less, about 0.17 or less, about 0.16 or less, about 0.15 or less, about 0.14 or less, about 0.13 or less, about 0.12 or less or about 0.11 or less.

Among these ranges, preferably x is greater than 0 and about 0.20 or less, as this will result in an excellent NOx purification rate at low temperature and lower $N_2O$ formation, as mentioned above.

The catalyst of the invention may also include precious metals and/or base metals as impurities other than Co, Mn and Ti, so long as the low temperature SCR activity is not inhibited.

The catalyst of the invention may support a precious metal and/or base metal such as Pt, Rh, Pd, Fe or Cu on the catalyst, so long as the low temperature SCR activity is not inhibited.

Illustrative examples and comparative examples will now be provided to aid in explanation, with the understanding that the invention is not restricted thereby.

EXAMPLES

Example 1

After adding 324 cc of distilled water to 0.09 and 0.01 mol of manganese acetate tetrahydrate and cobalt acetate tetrahydrate, respectively (manufacturer: Nacalai Tesque, Inc.) at room temperature, the mixture was agitated with a stirrer and dissolved. Next, 0.1 mol of titanium tetraisopropoxide (manufacturer: Nacalai Tesque, Inc.) and 0.32 mol of isopropanol (manufacturer: Nacalai Tesque, Inc.) were added over a period of 1 minute. The obtained solid was evaporated to dryness at 60° C. to obtain a powder. This was fired at 500° C. for 2 hours after temperature increase over 30 minutes, to prepare a CoMnTi complex catalyst with a Co-substitution value x of 0.10. Also, a pellet-shaped measuring sample was fabricated at a pressure of 1 t.

Example 2

A measuring sample was fabricated in the same manner as Example 1, except that cobalt acetate tetrahydrate was used with a Co-substitution value x of 0.20.

Reference Examples 1 and 2

A measuring sample was fabricated in the same manner as Example 1, except that cobalt acetate tetrahydrate was used with Co-substitution values x of 0.50 (Reference Example 1) and 0.80 (Reference Example 2).

Comparative Example 1

A measuring sample with a Co-substitution value x of 0 was fabricated in the same manner as Example 1, except that no cobalt acetate tetrahydrate was used.

Comparative Example 2

A measuring sample was fabricated in the same manner as Example 1, except that cobalt acetate tetrahydrate was used with a Co-substitution value x of 1.0.

Evaluation Tests
($NO_x$ Purification Rate Evaluation)

For a 5 cc catalyst sample there was used a test gas of $NH_3$: 500 ppm, NO: 500 ppm, $H_2O$: 5%, $O_2$: 10%, remainder: nitrogen (adjusted to 100% with nitrogen) (vol %), and the $NO_x$ purification rate was measured using a catalytic activity evaluator (manufacturer: Best Sokki, Ltd.) at an hourly space velocity of 180,000 $h^{-1}$, and a temperature of 150° C. or 300° C. with continuous temperature increase from 50° C. at 20° C/min.

($N_2O$ Formation Rate Evaluation)

This was evaluated by measuring the $N_2O$ formation rate in the same manner as the ($NO_x$ purification rate evaluation) described above, using a catalytic activity evaluator (manufacturer: Best Sokki, Ltd.) at a temperature of 300° C.

The $NO_x$ purification rate was evaluated at purification temperatures of 150° C. and 300° C., using samples for Example 2 and Comparative Examples 1 and 2.

As shown by the graph plotting purification rate (%) (FIG. 1), at a purification temperature of 300° C., the sample of Example 2 exhibited the most satisfactory results (300° C. (purification) in FIG. 1) compared to the Co-free sample of Comparative Example 1 and the sample of Comparative Example 2 which had all of the Mn replaced by Co, whereas at a purification temperature of 150° C., the purification rate values were high with the sample of Example 2 and the Co-free sample of Comparative Example 1, but the NOx purification rate was reduced with the sample of Comparative Example 2 which had all of the Mn replaced by Co (150° C. (purification) in FIG. 1).

On the other hand, the Co-free sample of Comparative Example 1 had the highest value for the $N_2O$ formation rate at a purification temperature of 300° C., whereas with the sample of Example 2, the results obtained were between those for the sample of Comparative Example 2 which had all of the Mn replaced by Co and the sample of Comparative Example 1 (300° C. (formation) in FIG. 1).

Thus, it was shown that the sample of Example 2 exhibits the most excellent NOx purification rate at purification temperatures of 150° C. and 300° C., and at 300° C., it exhibits excellent performance even for the $N_2O$ formation rate.

A $NO_x$ purification rate evaluation was conducted at purification temperatures of 150° C. and 300° C., using the samples of Examples 1 and 2, Reference Examples 1 and 2 and Comparative Example 1 and 2, with different Co-substitution values for Mn. At a purification temperature of 300° C., the samples of Example 1 ((h) in FIG. 2) and Example 2 ((i) in FIG. 2) had lower values than Reference Example 1 ((j) in FIG. 2) and Reference Example 2 ((k) in FIG. 2), but at a purification temperature of 150° C., the samples of Example 1 ((b) in FIG. 2) and Example 2 ((c) in FIG. 2) not only exhibited markedly more excellent purification rates than Reference Example 1 ((d) in FIG. 2) and Reference Example 2 ((e) in FIG. 2), but were also superior to the samples of Comparative Example 1 ((a) and (g) in FIG. 2) and Comparative Example 2 ((f) and (l) in FIG. 2) at all of the temperatures.

Figure 2:
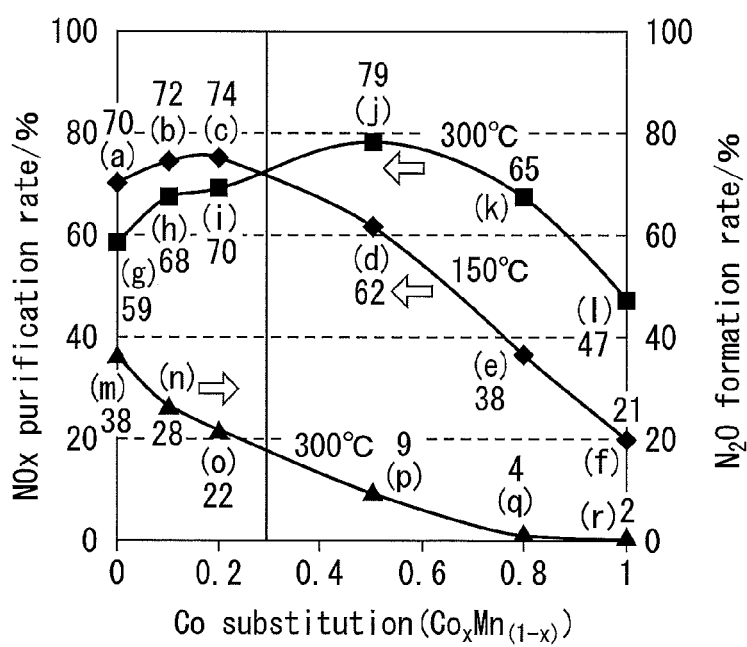
FIG. 2 is a graph plotting NOx purification rates at 150° C. ((a) to (f)), NOx purification rates at 300° C. ((g) to (1)) and $N_2O$ formation rates at 300° C. ((m) to (r)) for molar ratios x changed to 0 (Comparative Example 1), 0.1 (Example 1), 0.2 (Example 2), 0.5 (Reference Example 1), 0.8 (Reference Example 2) and 1.0 (Comparative Example 2), in $Co_xMn_{(1-x)}TiO_3$.

Furthermore, in the evaluation of the $N_2O$ formation rate at a purification temperature of 300° C., it was found that the $N_2O$ formation rate decreased with increasing x, the samples of Example 1 ((n) in FIG. 2) and Example 2 ((o) in FIG. 2) having formation rates that were lower than the sample of Comparative Example 1 ((m) in FIG. 2), and between the samples of Reference Example 1 ((p) in FIG. 2) and Reference Example 2 ((q) in FIG. 2) and the sample of Comparative Example 1.

Thus, it was shown that the samples of Examples 1 and 2 exhibit excellent NOx purification rates at purification temperatures of 150° C. and 300° C., while exhibiting excellent performance even for the $N_2O$ formation rate at 300° C.

INDUSTRIAL APPLICABILITY

According to the exhaust gas purification device of the invention, $Mn_xTi_{1-x}$ having a prescribed composition is used to achieve a higher $NO_x$ purification rate and to allow purification of $NO_x$ at lower temperature. It is thus possible to provide high $NO_x$ purification performance for a wide range of exhaust gas compositions, without requiring the heating temperature to be high as in the prior art.

What is claimed is:

1. An exhaust gas purification method, comprising contacting an exhaust gas with (i) a selective reduction catalyst comprising a composite oxide represented by the formula, $Co_xMn_{(1-x)}TiO_3$, where x in the molar ratio is a value greater than 0 and 0.2 or less, and (ii) $NH_3$ as a reducing agent.

2. The exhaust gas purification method according to claim 1, wherein x is 0.1 or more and 0.2 or less.

* * * * *